US012351775B2

(12) United States Patent
Lo et al.

(10) Patent No.: US 12,351,775 B2
(45) Date of Patent: Jul. 8, 2025

(54) NEUTRALIZING INSTRUMENT REPROCESSING

(71) Applicant: ECOLAB USA INC., Saint Paul, MN (US)

(72) Inventors: Wendy Lo, Saint Paul, MN (US); Michael S. Rischmiller, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 104 days.

(21) Appl. No.: 17/663,246

(22) Filed: May 13, 2022

(65) Prior Publication Data

US 2022/0364018 A1   Nov. 17, 2022

Related U.S. Application Data

(60) Provisional application No. 63/262,888, filed on Oct. 22, 2021, provisional application No. 63/201,817, filed on May 14, 2021.

(51) Int. Cl.
*C11D 1/72* (2006.01)
*A01N 37/36* (2006.01)
(Continued)

(52) U.S. Cl.
CPC ............... *C11D 1/72* (2013.01); *A01N 37/36* (2013.01); *A01P 1/00* (2021.08); *C11D 3/2086* (2013.01); *C11D 17/0008* (2013.01); *C23C 22/48* (2013.01); *C23G 1/02* (2013.01); *C11D 2111/16* (2024.01)

(58) Field of Classification Search
CPC ... C11D 11/0029; C11D 17/0008; C11D 1/04; C11D 3/2075; C11D 3/48; C23C 22/48; C23G 1/02; A01N 37/36; A01P 1/00
See application file for complete search history.

(56) References Cited

U.S. PATENT DOCUMENTS 3,909,437 A   9/1975  Alexander et al.
4,256,601 A   3/1981  Sobata et al.
(Continued)

FOREIGN PATENT DOCUMENTS

AU   2000059890 A1   4/2001
AU   2000064493 A1   4/2001
(Continued)

OTHER PUBLICATIONS

International Search Report and Written Opinion in PCT/US2022/029127, mailed Sep. 8, 2022, 8 pages.
(Continued)

*Primary Examiner* — Anthony M Liang
(74) *Attorney, Agent, or Firm* — McKee, Voorhees & Sease, PLC

(57) ABSTRACT

A neutralizer, destainer/descaling, and passivating composition and methods of using the same on metal surfaces are disclosed. The compositions are particularly well suited for the treatment of health care surfaces and other hard surfaces in need of treatment. In particular, the neutralizer, destainer/descaling, and passivating composition is an acid-based composition for use in instrument reprocessing.

9 Claims, 4 Drawing Sheets
(2 of 4 Drawing Sheet(s) Filed in Color)

(51) Int. Cl.
*A01P 1/00* (2006.01)
*C11D 3/20* (2006.01)
*C11D 11/00* (2006.01)
*C11D 17/00* (2006.01)
*C23C 22/48* (2006.01)
*C23G 1/02* (2006.01)

(56) References Cited

U.S. PATENT DOCUMENTS

| | | |
|---|---|---|
| 4,311,618 A | 1/1982 | Schäfer-Burkhard |
| 5,489,531 A | 2/1996 | Benson |
| 5,705,472 A | 1/1998 | Hayes et al. |
| 5,766,684 A | 6/1998 | Shah et al. |
| 6,096,701 A | 8/2000 | Mondin et al. |
| 6,239,092 B1 | 5/2001 | Papasso et al. |
| 6,703,358 B1 | 3/2004 | Aubay et al. |
| 6,767,410 B2 | 7/2004 | Aubay et al. |
| 6,794,346 B2 | 9/2004 | Wick et al. |
| 6,849,586 B2 | 2/2005 | Avery et al. |
| 7,144,846 B2 | 12/2006 | Keller et al. |
| 7,214,651 B2 | 5/2007 | Mohr et al. |
| 7,341,983 B2 | 3/2008 | Pedersen et al. |
| 7,368,417 B2 | 5/2008 | Gaudreault |
| 7,635,672 B1 | 12/2009 | Dastbaz et al. |
| 7,648,583 B2 | 1/2010 | McRae et al. |
| 7,745,383 B2 | 6/2010 | Dreja et al. |
| 8,198,227 B2 | 6/2012 | Cermenati et al. |
| 8,293,174 B2 | 10/2012 | Kaiser et al. |
| RE44,058 E | 3/2013 | Aubay et al. |
| 8,512,484 B2 | 8/2013 | Laudenklos et al. |
| 8,574,370 B2 | 11/2013 | Laffitte et al. |
| 8,815,788 B2 | 8/2014 | Osborn et al. |
| 8,921,295 B2 | 12/2014 | Kneipp et al. |
| 9,006,286 B2 | 4/2015 | Kiesel et al. |
| 9,486,892 B2 | 11/2016 | Onishi et al. |
| 9,546,346 B2 | 1/2017 | Bjelopavlic et al. |
| 11,026,422 B2 | 6/2021 | Hanson et al. |
| 11,129,385 B2 | 9/2021 | Alderson |
| 2003/0109395 A1 | 6/2003 | Neumiller |
| 2005/0130873 A1 | 6/2005 | Cheung et al. |
| 2008/0004197 A1 | 1/2008 | Kneer |
| 2008/0011323 A1* | 1/2008 | Fischer ............... B23K 26/38 134/3 |
| 2008/0096784 A1 | 4/2008 | Barg et al. |
| 2012/0142577 A1 | 6/2012 | Sun et al. |
| 2013/0079408 A1 | 3/2013 | Ho |
| 2013/0157921 A1 | 6/2013 | Marin et al. |
| 2013/0303430 A1 | 11/2013 | Reinoso Garcia et al. |
| 2014/0039051 A1 | 2/2014 | Strodtholz et al. |
| 2019/0169541 A1 | 6/2019 | Hodge et al. |
| 2019/0330568 A1 | 10/2019 | Ceulemans et al. |
| 2020/0345005 A1 | 11/2020 | Tinwala et al. |
| 2020/0367492 A1 | 11/2020 | Budhian et al. |
| 2021/0340464 A1 | 11/2021 | Anderson et al. |

FOREIGN PATENT DOCUMENTS

| | | | |
|---|---|---|---|
| AU | 2001253046 B2 | 10/2001 | |
| AU | 2003259326 B2 | 3/2004 | |
| AU | 2008294615 B2 | 3/2009 | |
| BE | 1027322 B1 | 1/2021 | |
| BR | 112012009188 A2 | 8/2016 | |
| BR | PI0911361 A2 | 11/2016 | |
| BR | PI0820350 B1 | 5/2017 | |
| BR | 112015028651 A2 | 7/2017 | |
| BR | 112012001605 A2 | 11/2019 | |
| BR | 112013011859 B1 | 11/2020 | |
| CA | 2108898 C | 12/1992 | |
| CA | 2126626 A1 | 12/1994 | |
| CA | 2235484 C | 5/1997 | |
| CA | 2331582 C | 11/1999 | |
| CA | 2396742 C | 8/2001 | |
| CA | 2397496 C | 9/2001 | |
| CA | 2515399 C | 9/2004 | |
| CA | 2554746 C | 8/2005 | |
| CA | 2719335 C | 10/2009 | |
| CA | 2782407 C | 6/2011 | |
| CA | 2727123 C | 3/2017 | |
| CN | 1132802 A | 10/1996 | |
| CN | 1137977 C | 2/2004 | |
| CN | 1478923 A | 3/2004 | |
| CN | 101654599 A | 2/2010 | |
| CN | 102002722 A | 4/2011 | |
| CN | 103882443 A | 6/2014 | |
| CN | 104313607 A | 1/2015 | |
| CN | 104629945 A | 5/2015 | |
| CN | 104845745 A | 8/2015 | |
| CN | 102337080 B | 1/2016 | |
| CN | 105733822 A | 7/2016 | |
| CN | 104947113 B | 8/2017 | |
| CN | 109072132 A | 12/2018 | |
| CN | 104508108 B | 3/2019 | |
| CN | 109487280 A | 3/2019 | |
| CN | 109536969 A | 3/2019 | |
| CN | 112105265 A | 12/2020 | |
| CN | 112203513 A | 1/2021 | |
| DE | 102004019022 A1 | 11/2005 | |
| DE | 4210364 B4 | 5/2006 | |
| DE | 102007014875 A1 | 10/2008 | |
| DE | 102007016201 A1 | 10/2008 | |
| DE | 102009001559 A1 | 12/2009 | |
| EP | 0592906 A1 | 4/1994 | |
| EP | 1009781 A1 | 6/2000 | |
| EP | 1466961 A1 | 10/2004 | |
| EP | 1706472 A2 | 8/2005 | |
| EP | 1180133 B1 | 6/2008 | |
| EP | 1899449 B1 | 8/2009 | |
| EP | 1904613 B1 | 12/2009 | |
| EP | 2184620 A1 | 5/2010 | |
| EP | 1196528 B1 | 8/2010 | |
| EP | 2221357 A1 | 8/2010 | |
| EP | 1781717 B1 | 11/2012 | |
| EP | 2231844 B1 | 8/2015 | |
| EP | 2245213 B1 | 1/2016 | |
| EP | 2586855 B1 | 6/2016 | |
| EP | 2152845 B1 | 3/2017 | |
| EP | 2304008 B1 | 10/2017 | |
| EP | 3418362 A1 * | 12/2018 | ............. C11D 1/825 |
| EP | 3337885 B1 | 9/2020 | |
| EP | 2617867 B1 | 3/2022 | |
| FR | 2520373 A1 | 7/1983 | |
| GB | 2429015 A | 2/2007 | |
| HK | 1189618 B | 6/2020 | |
| HK | 1189619 B | 6/2020 | |
| IN | 228599 B | 12/2005 | |
| IN | 200400447 P4 | 12/2005 | |
| IN | 231322 B | 5/2007 | |
| IN | 200502340 P4 | 5/2007 | |
| IN | 226695 B | 7/2007 | |
| IN | 200502342 P4 | 7/2007 | |
| IN | 200200688 P1 | 2/2010 | |
| IN | 201200440 P4 | 4/2013 | |
| IN | 201203640 P4 | 8/2013 | |
| IN | 294414 B | 11/2014 | |
| IN | 330195 B | 11/2014 | |
| IN | 201304408 P1 | 11/2014 | |
| IN | 312797 B | 5/2015 | |
| IN | 351216 B | 6/2018 | |
| IN | 201847019472 A | 6/2018 | |
| IN | 201941011280 A | 9/2020 | |
| IN | 202048044958 A | 10/2020 | |
| JP | S5892499 A | 6/1983 | |
| JP | 1135987 A | 2/1999 | |
| JP | 2003516751 A | 5/2003 | |
| JP | 3417703 B2 | 6/2003 | |
| JP | 2003534396 A | 11/2003 | |
| JP | 4942981 B2 | 5/2012 | |
| JP | 5514722 B2 | 6/2014 | |
| KR | 2020082374 A | 7/2020 | |
| NZ | 532144 A | 3/2006 | |
| NZ | 585930 A | 12/2011 | |
| PL | 191444 B1 | 5/2006 | |
| RU | 2013149225 A | 5/2015 | |

(56) References Cited

FOREIGN PATENT DOCUMENTS

| | | | |
|---|---|---|---|
| TW | 200630471 A | 9/2006 | |
| TW | 200941582 A | 10/2009 | |
| TW | 201512392 A | 4/2015 | |
| TW | I503878 B | 10/2015 | |
| WO | 0063337 A1 | 10/2000 | |
| WO | 0121753 A1 | 3/2001 | |
| WO | 0157174 A1 | 8/2001 | |
| WO | 03020863 A1 | 3/2003 | |
| WO | 03031550 A1 | 4/2003 | |
| WO | 2005017083 A1 | 2/2005 | |
| WO | 2006114243 A1 | 11/2006 | |
| WO | 2007001593 A1 | 1/2007 | |
| WO | WO-2007098831 A1 * | 9/2007 | ............ C11D 1/825 |
| WO | 2008116509 A1 | 10/2008 | |
| WO | 2009092817 A1 | 7/2009 | |
| WO | 2018075089 A1 | 4/2018 | |
| WO | 2020018356 A1 | 1/2020 | |

OTHER PUBLICATIONS

International Search Report and Written Opinion in PCT/US2022/029127, 8 pages, mailed Sep. 8, 2022.

* cited by examiner

NEUTRALIZING INSTRUMENT REPROCESSING

CROSS-REFERENCE TO RELATED APPLICATIONS

This application claims priority under 35 U.S.C. § 119 to provisional application Ser. No. 63/201,817, filed May 14, 2021, and provisional application Ser. No. 63/262,888, filed Oct. 22, 2021, both of which are herein incorporated by reference in their entirety.

FIELD OF THE INVENTION

The invention relates to a composition having neutralizing, destaining/descaling, and passivating effects. In particular, an acid-based neutralizer is provided for health care instrument reprocessing in washers and static soak, where the compositions further removes scale deposits, rust, and stains, in addition to providing passivation on metal surfaces.

BACKGROUND

Various surfaces, instruments, equipment, and wares within the health care and food processing industries require adequate disinfection and sterilization to ensure that such surfaces do not transmit infectious pathogens to others. Particularly for reusable health care instruments and health care surfaces, instrument reprocessing is essential for providing adequate instrument cleaning, disinfection and/or sterilization. Contaminated health care instruments pose a health risk for surgical site infections, and therefore, proper treatment and cleaning procedures, including effectively reprocessing surgical instruments, are crucial in reducing the risk of transmitting infections.

Instrument reprocessing provides several benefits, including providing economic cost benefits to a health care facility in providing reusable medical devices and instruments. However, reusable instruments must be reprocessed prior to its next use. Therefore, the harsh cleaning conditions rendered through repeated instrument reprocessing cycles can significantly reduce the usable lifespan and functionality of the surfaces and instruments being treated. The wear and repeated exposure of these surfaces to extreme processing conditions can result in corrosion and stains forming on the surface. Without properly removing the scale deposits and stains, they can lead to further chemical and microbial contamination. In order to maintain the instruments and equipment utilized in reprocessing, there is an ongoing need for providing cleaning compositions utilized for reprocessing to further provide removal of scale deposits and stains, such as rust, which may develop on the metal surfaces.

To further combat the effects from instrument reprocessing, there is a further need for improved compositions that protect the passive layer of a metal surface. The passive layer of a metal surface is a thin semiconducting oxide film that forms on the surface when it comes into contact with oxygen. For example, in non-corrosive steel, the oxygen reacts with chromium atoms to form the passive layer on the surface. Passivation assists with reducing the tendency of a metal to corrode as the passive layer prevents the oxidation from proceeding. Passivity may further result from precipitation of solid salts to form a thicker, but porous layer. However, the formation of stains and scale deposits can occur if the passive layer does not form, or if the passive layer is damaged. Therefore, there remains a need for improved compositions that not only reduce and/or remove scale deposits and stains from a surface, but further protects the passive layer of a metal surface.

To address the need for passivating a surface, U.S. Pat. No. 8,512,484 describes the importance of passivating by phosphating. Phosphating is a known method of surface technology wherein, by a chemical reaction between the metallic surface of the workpiece and an aqueous phosphate solution, a conversion layer of tightly adhering metal phosphates is formed. However, the use of phosphorous raw materials in detergents has become undesirable for a variety of reasons, including environmental reasons. This has resulted in heavy regulation of phosphorus-based chemistries. Thus, industries are seeking alternative ways to clean hard surfaces and control hard water scale formation associated with highly alkaline detergents. Many commercially available detergent formulations have employed sodium tripolyphosphate as a cost-effective component for controlling hard water scale and providing detergency. However, as formulations are adapted to contain less than 0.5 wt-% phosphorus, there is a need for identifying replacement cleaning components that are substantially phosphorous-free.

Accordingly, it is an objective of the disclosure to develop effective neutralizing compositions that further reduce and remove scale deposits and stains, such as rust, on metal surfaces, while protecting the passive layer of the metal surface.

A further object of the disclosure is to provide a neutralizer, destainer, and passivating composition that prolongs the lifespan of health care surfaces, equipment, and instruments.

Other objects, advantages and features of the present disclosure will become apparent from the following specification taken in conjunction with the accompanying figures.

BRIEF SUMMARY

In an embodiment, the present disclosure relates to a neutralizer, destainer, and passivating composition provided in a single acid-based composition employing at least one acid, a nonionic surfactant, and water, and methods of using the same. In embodiments a neutralizer, destainer, and passivating composition comprises at least one acid comprising citric acid, an alkoxylated nonionic surfactant, and water. In embodiments at least one acid further comprises a weak acid comprising lactic acid, oxalic acid, tartaric acid, malic acid, gluconic acid, or a combination thereof. In embodiments the compositions have a ratio of the weak acid and the citric acid on a weight percent basis is (a) from about 1:20 to about 1:90, (b) from about 20:1 to about 90:1, or (c) from about 1:60 to about 60:1. In embodiments the composition achieves a pass rating under a passivation test according to ASTM A380/A380M-17 and/or ASTM A967/A967M-17, and/or does not cause any discoloration to a treated surface.

In embodiments a method of neutralizing, destaining, and/or passivating a metal surface comprises: providing a neutralizer, destainer, and passivating composition as described herein, and contacting the composition to a metal surface in need of treatment. Exemplary metal surfaces include health care instruments, such that the step of contacting the composition occurs within a washer for health care instrument reprocessing. In embodiments the step of contacting the composition occurs in a static soak of the metal surface for health care instrument reprocessing. Beneficially the compositions and methods remove scale deposits, rust, and/or stains from the metal surface. Moreover, the compositions and methods maintain and/or restore the passive layer of the metal surface. In embodiments, the composition is applied to the metal surface under any of the conditions described herein, including for a period of time from about 1 minute to about 30 minutes, at a temperature of between about 25° C. to about 120° C., in a diluted form as a use solution, including at a pH of about 7 or less.

In embodiments the methods achieve a pass rating under a passivation test according to ASTM A380/A380M-17 and/or ASTM A967/A967M-17, and/or does not cause any discoloration to a treated surface. While multiple embodiments are disclosed, still other embodiments of the present disclosure will become apparent to those skilled in the art from the following detailed description, which shows and describes illustrative embodiments of the disclosure. Accordingly, the figures and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
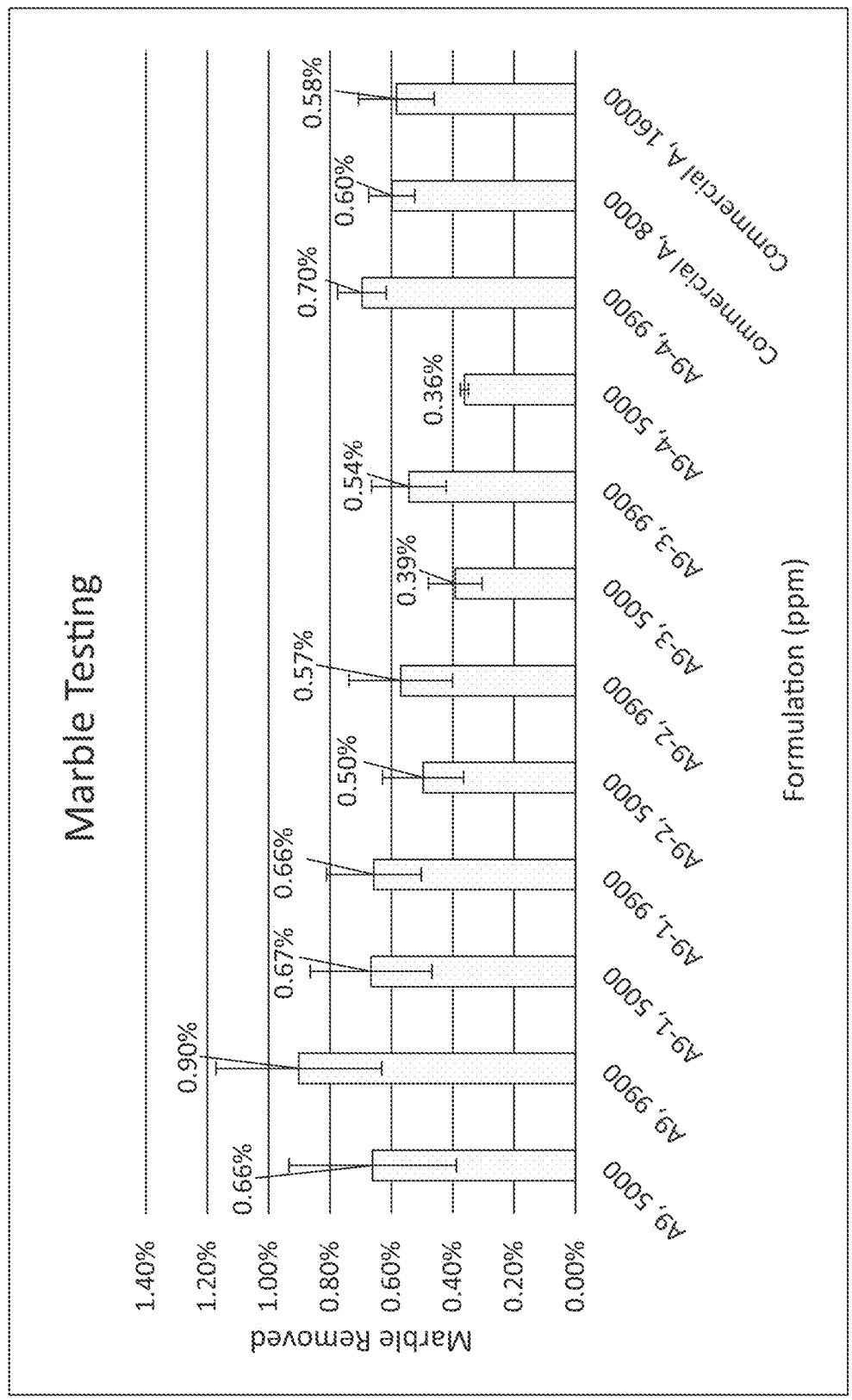
FIG. 1 shows a graph of the formulations that were evaluated for marble removal, with the higher percentage of marble removed demonstrating superior descaling efficacy.

Various embodiments of the present disclosure will be described in detail with reference to the figures, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION

The present disclosure relates to an acid-based composition having neutralizing, destaining/descaling, and passivating effects, and methods of using the same. The composition and methods herein have many advantages over existing neutralizing compositions. For example, the composition not only functions as a neutralizer, but further provides removal of scale deposits and rust stains on metal surfaces, such as for health care instrument reprocessing, while providing passivation to the treated surface. The compositions are further substantially phosphorus-free and still provide effective scale control.

The embodiments of this disclosure are not limited to particular compositions and methods of use, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4%. This applies regardless of the breadth of the range.

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the term "analog" means a molecular derivative of a molecule. The term is synonymous with the terms "structural analog" or "chemical analog."

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic, and random symmetries, and combinations thereof. Furthermore, unless otherwise specifically limited, the term "polymer" shall include all possible geometrical configurations of the molecule.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, "agricultural" or "veterinary" objects or surfaces include animal feeds, animal watering stations and enclosures, animal quarters, animal veterinarian clinics (e.g., surgical or treatment areas), animal surgical areas, and the like.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present disclosure to assist in reducing redepositing of the removed soil onto the surface being cleaned.

The term "surfactant" refers to a molecule having surface activity, including wetting agents, dispersants, emulsifiers, detergents, and foaming agents, and the like. It is understood to be inclusive of the use of a single surfactant or multiple surfactants.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bedpans, etc.), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheelchairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present disclosure. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present disclosure. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthroscopes) and related equipment, and the like, or combinations thereof.

As used herein, the term "instrument reprocessing" refers to a multistep process to clean and disinfect or sterilize a reusable instrument, resulting in an instrument that can be safely used in a subject or mammal. The multistep process may include, but is not limited to, a pretreatment, manual wash, automated wash, ultrasonic wash, and cleaning verification step. Instrument reprocessing reduces the risk of surgical site infections, increases central sterile processing efficiency, and raises sterility assurance levels.

As used herein, the terms "passivation" and "passivating" refers to a metal-finishing process to prevent corrosion. For example, passivation of stainless steel is the removal of exogenous iron or iron compounds from the surface by means of a chemical dissolution that will remove the surface contamination but will not significantly affect the stainless steel itself for the purpose of enhancing the spontaneous formation of a passive layer.

As used herein, the term "passive layer" refers to a thin semiconducting oxide film that forms on a metal surface when it comes into contact with oxygen. For example, in non-corrosive steel, the oxygen reacts with chromium atoms to form the passive layer on the surface. The passive layer prevents the oxidation from proceeding on the metal surface.

As used herein, the term "phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term "substantially phosphorus-free" refers to compositions completely lacking phosphorus or having such a small amount of phosphorus that the phosphorous does not affect the performance of the composition. The phosphorus may be present as an impurity or as a contaminant and shall be less than 0.5 wt-%. In another embodiment, the amount of phosphorus is less than 0.1 wt-% and in yet another embodiment, the amount of phosphorus is less than 0.01 wt-%.

As used herein, the term "sanitizer" refers to an agent that reduces the number of bacterial contaminants to safe levels as judged by public health requirements. In an embodiment, sanitizers for use in this disclosure will provide at least a 3-log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the disclosure include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the disclosure include polyethylene terephthalate (PET) polystyrene polyamide.

The terms "water soluble" and "water dispersible" as used herein, means that the polymer is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the present disclosure as well as other ingredients described herein. As used herein, "consisting essentially of" means that the methods and compositions may include additional steps, components, or ingredients, but only if the additional steps, components or ingredients do not materially alter the basic and novel characteristics of the claimed methods and compositions.

Compositions

The neutralizer, destainer, and passivating compositions include a combination of at least one acid, nonionic surfactant, and a carrier for treating a surface, preferably a metal surface. In some aspects, the at least one acid comprises two acids provided in a specific ratio and doses for providing effective performance in health care instrument reprocessing. Beneficially, the compositions are effective at neutralizing, while also reducing scale deposits and rust staining on the treated surface, and further including passivation of the treated surface.

In an aspect, the compositions comprise, consist of or consist essentially of at least one acid, a nonionic surfactant, and carrier disclosed herein. In further aspects, the compositions further include at least one acid comprising citric acid and an alkoxylated nonionic surfactant. In further aspects, the compositions comprise, consist of or consist essentially of at least one acid comprising citric acid and further comprises a weak acid comprising lactic acid, oxalic acid, or a combination thereof, and an alcohol alkoxylate nonionic surfactant. The compositions can additionally include water as the carrier and additional functional ingredients. Exemplary ranges of the compositions are shown in Tables 1, 1A, 1A1, 1A2 and 1A3 in weight percentage. While the components may have a percent actives of 100%, it is noted that Tables 1, 1A, 1A1, 1A2 and 1A3 do not recite the percent actives of the components, but rather, recites the total weight percentage of the raw materials (i.e. active concentration plus inert ingredients).

TABLE 1

| Component | Exemplary wt-% Ranges | | | |
|---|---|---|---|---|
| | 1 | 2 | 3 | 4 |
| Acid(s) | 10-90 | 20-85 | 40-80 | 45-75 |
| Nonionic Surfactant | 0.001-10 | 0.01-5 | 0.1-3 | 0.5-2 |
| Water | 5-80 | 10-70 | 20-50 | 25-45 |
| Optional Additional Functional Ingredients | 0-25 | 0-20 | 0-15 | 0-10 |

TABLE 1A

| Component | Exemplary wt-% Ranges | | | |
|---|---|---|---|---|
| | 1 | 2 | 3 | 4 |
| First Acid | 10-50 | 15-50 | 20-50 | 25-50 |
| Second Acid | 1-50 | 2-50 | 2-45 | 2-40 |
| Nonionic Alcohol Alkoxylate Surfactant | 0.001-10 | 0.01-5 | 0.1-3 | 0.5-2 |
| Water | 5-80 | 10-70 | 20-50 | 25-45 |
| Optional Additional Functional Ingredients | 0-25 | 0-20 | 0-15 | 0-10 |

TABLE 1A1

| Component | Exemplary wt-% Ranges | | | |
|---|---|---|---|---|
| | 1 | 2 | 3 | 4 |
| First Acid | 10-80 | 15-80 | 40-75 | 50-75 |
| Second Acid | 0.001-10 | 0.01-5 | 0.1-3 | 0.5-2.5 |
| Nonionic Alcohol Alkoxylate Surfactant | 0.001-10 | 0.01-5 | 0.1-3 | 0.5-2 |
| Water | 5-80 | 10-70 | 20-50 | 25-45 |
| Optional Additional Functional Ingredients | 0-25 | 0-20 | 0-15 | 0-10 |

TABLE 1A2

| Component | Exemplary wt-% Ranges | | | |
|---|---|---|---|---|
| | 1 | 2 | 3 | 4 |
| Citric Acid | 10-80 | 15-80 | 40-75 | 50-75 |
| Additional Weak Acid (i.e. lactic acid, oxalic acid) | 0.001-10 | 0.01-5 | 0.1-3 | 0.5-2.5 |
| Nonionic Alcohol Alkoxylate Surfactant | 0.001-10 | 0.01-5 | 0.1-3 | 0.5-2 |
| Water | 5-80 | 10-70 | 20-50 | 25-45 |
| Optional Additional Functional Ingredients | 0-25 | 0-20 | 0-15 | 0-10 |

TABLE 1A3

| Component | Exemplary wt-% Ranges | | | |
|---|---|---|---|---|
| | 1 | 2 | 3 | 4 |
| Citric Acid | 0.001-10 | 0.01-5 | 0.1-3 | 0.5-2.5 |
| Additional Weak Acid (i.e. lactic acid, oxalic acid) | 10-80 | 15-80 | 40-75 | 50-75 |
| Nonionic Alcohol Alkoxylate Surfactant | 0.001-10 | 0.01-5 | 0.1-3 | 0.5-2 |
| Water | 5-80 | 10-70 | 20-50 | 25-45 |
| Optional Additional Functional Ingredients | 0-25 | 0-20 | 0-15 | 0-10 |

The compositions are preferably liquid products. The liquid compositions can be provided in various forms well appreciated by those skilled in the art. The compositions may be provided in solid products in various forms well appreciated by those skilled in the art. The compositions may include concentrate compositions or may be diluted to form use compositions/use solutions. In general, a concentrate refers to a composition that is intended to be diluted with water to provide a use solution that contacts a surface to provide the desired neutralizing, destaining, cleaning, rinsing, or the like. The composition that contacts the surfaces to be washed can be referred to as a concentrate or a use composition (or use solution) dependent upon the formulation employed for methods of use.

In an aspect, the dilution of the compositions does not include deionized water and/or softened water. Preferably a water source having hardness ions is employed. At least 5 grains per gallon (gpg) hardness water is preferred.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000. In an embodiment, the concentrate is diluted at a ratio of between about 1:10 and about 1:10,000 concentrate to water, or between about 1:10 and about 1:1,000 concentrate to water.

In an embodiment the use solution provides a total formulation concentration of from about 100 ppm to about 30,000 ppm of the composition, from about 1000 ppm to about 25,000 ppm of the composition, or from about 3000 ppm to about 12,500 ppm of the composition. In embodiments, the use solution provides the at least one acid in an amount of from about 700 ppm to about 12,000 ppm, from about 1000 ppm to about 10,000 ppm, or from about 1500 ppm to about 10,000 ppm. In a further embodiment, the use solution provides the nonionic surfactant in an amount of from about 25 ppm to about 500 ppm, from about 30 ppm to about 400 ppm, or from 40 ppm to about 400 ppm.

Acids

In an aspect, the neutralizer, destainer, and passivating compositions include at least one acid. In embodiments, the compositions include two acids. In such an aspect, the acids can be a combination of two weak acids. For the purposes of this disclosure, an acid is a component that can be added to an aqueous system and result in a pH less than 7. "Weak" organic and inorganic acids are acids or acid components in which the first dissociation step of a proton from the acid moiety does not proceed essentially to completion when the acid is dissolved in water at ambient temperatures at a concentration within the range useful to form the present compositions. In a preferred aspect, the compositions include a weak acid having a pKa greater than about 2.5.

Exemplary weak acids suitable for use in the compositions include an alpha hydroxycarboxylic acid, such as lactic acid, citric acid, oxalic acid, tartaric acid, malic acid, gluconic acid, and the like; carboxylic acids, such as formic acid, acetic acid, propionic acid, and the like; other common organic acids such as ascorbic acid, glutamic acid, levulinic acid, etc. could also be used.

The acid in the compositions provides a neutral to acidic pH liquid product formulations, such as use solutions of the compositions having a pH in the range of about 2 to about 4, in the range of about 4 to about 8, or about 7 or less. The acid is provide in a sufficient wt-% of the formulation to provide a neutral to acidic pH, preferably an acidic pH, which is distinct from acids used in a buffer composition alone to provide a neutral pH.

In an embodiment, an acid package in combination with a nonionic surfactant disclosed herein results in surprisingly effective compositions that decrease scaling and staining, while further providing effective passivation on a surface in need of treatment. In an embodiment, the composition comprises a first acid and a second acid, wherein both the first acid and second acid are weak acids. In a preferred embodiment, the at least one acid comprises citric acid. In a further embodiment, the at least one acid comprises citric acid and an additional weak acid comprising lactic acid, oxalic acid, tartaric acid, malic acid, gluconic acid, formic acid, acetic acid, propionic acid, ascorbic acid, glutamic acid, levulinic acid, or a combination thereof. In an exemplary embodiment, the at least one acid comprises citric acid and lactic acid.

In an embodiment, the neutralizer, destainer, and passivating compositions and methods do not require the use of any oxidizing agents, including peroxycarboxylic acids and hydrogen peroxide. In an aspect, the neutralizer, destainer, and passivating composition is substantially free of peroxycarboxylic acids and/or hydrogen peroxide.

In embodiments where two acids are provided, the ratio of the acids are beneficially provided on a weight percentage basis of from about 1:20 to about 1:90, from about 1:40 to about 1:70, or from about 1:50 to about 1:70.

In an aspect, the composition includes from about 10 wt-% to about 90 wt-%, about 20 wt-% to about 85 wt-%, about 40 wt-% to about 80 wt-%, or about 45 wt-% to about 75 wt-% of the at least one acid. All ranges recited are inclusive of the numbers defining the range and include each integer within the defined range.

In a further aspect, the composition includes two acids, wherein the first acid is present in an amount of from about 10 wt-% to about 80 wt-%, about 15 wt-% to about 80 wt-%, about 40 wt-% to about 75 wt-%, or about 50 wt-% to about 75 wt-%, and wherein the second acid is present in an amount of from about 0.001 wt-% to about 10 wt-%, about 0.01 wt-% to about 5 wt-%, about 0.1 wt-% to about 3 wt-%, or about 0.5 wt-% to about 2.5 wt-% of the second acid. All ranges recited are inclusive of the numbers defining the range and include each integer within the defined range. In an aspect, the first acid is citric acid, and the second acid is an additional weak acid. In a preferred embodiment, the additional weak acid comprises lactic acid, oxalic acid, or a combination thereof. In another aspect, the first acid is the additional weak acid and the second acid is citric acid. In a preferred embodiment, the additional weak acid comprises lactic acid, oxalic acid, or a combination thereof.

In still further embodiments where two acids are provided, the ratio of the acids can also be provided on a weight percentage basis of from about 1:60 to about 60:1, from about 1:50 to about 50:1, or from about 1:40 to about 40:1.

In a still further aspect, the composition includes two acids, wherein the first acid is present in an amount of from about 10 wt-% to about 50 wt-%, about 15 wt-% to about 50 wt-%, about 20 wt-% to about 50 wt-%, or about 25 wt-% to about 50 wt-%, and wherein the second acid is present in an amount of from about 1 wt-% to about 50 wt-%, about 2 wt-% to about 50 wt-%, about 2 wt-% to about 45 wt-%, or about 2 wt-% to about 40 wt-% of the second acid. All ranges recited are inclusive of the numbers defining the range and include each integer within the defined range. In an aspect, the first acid can be either the citric acid or the additional weak acid.

Surfactants

In an aspect, the composition includes at least one surfactant. Surfactants suitable for use with the compositions include, but are not limited to, nonionic surfactants, amphoteric surfactants, anionic surfactants, and zwitterionic surfactants.

In preferred embodiments, the surfactant includes a defoaming nonionic surfactant. Suitable defoaming nonionic surfactants suitable for use with the compositions include alkoxylated surfactants and polymer compounds including one or more ethylene oxide groups. In embodiments, the nonionic surfactant includes a polyether compound prepared from ethylene oxide, propylene oxide, or a mixture thereof. In yet further embodiments, suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R—O-(EO)$_5$(PO)$_4$—H) and Dehypon LS-36 (R—O-(EO)$_3$(PO)$_6$—H); and capped alcohol alkoxylates, such as Plurafac LF221 and Tegoten EC11; mixtures thereof, or the like.

In an aspect, the surfactant includes a nonionic alcohol alkoxylate surfactant having the following formula: $R^1$—O-(EO)$_x$(PO)$_y$—H, wherein $R^1$ is a straight-chain $C_{10}$-$C_{16}$-alkyl, and wherein x=4-8 and wherein y=2-5. In an additional aspect, the surfactant includes a nonionic alkoxylated surfactant comprising a branched alcohol alkoxylate having both ethylene oxide and propylene oxide groups. A preferred branched alcohol alkoxylate surfactant has the following formula: 2-ethylhexyl(PO)$_m$(EO)$_n$ wherein m=3-14, 6-9, or 9 and n=3-10, 5-8, or 7.

In an aspect, the composition includes from about 0.001 wt-% to about 10 wt-%, about 0.01 wt-% to about 5 wt-%, about 0.1 wt-% to about 3 wt-%, about 0.5 wt-% to about 2 wt-%, about 0.5 wt-% to about 1.5 wt-%, or about 0.5 wt-% to about 1 wt-% of the nonionic surfactant. All ranges recited are inclusive of the numbers defining the range and include each integer within the defined range.

Carriers

The compositions are formulated as liquids. Carriers can be included in such liquid formulations. Any carrier suitable for use in a neutralizing composition can be used in the present disclosure. For example, in some embodiments the compositions include water as a carrier. Various water sources can be employed in the compositions, including either deionized water or non-deionized water. Without being limited to a particular mechanism of action, the liquid formulations can include deionized water as a carrier, however, water for dilution is not deionized water which surprisingly alters the pH range of the use solutions of the compositions, including for example outside a desired range of about 4 to about 7. In a preferred embodiment the water source for the composition can be deionized water and the water source for dilution can be from any water source including water that is not deionized and instead contains water hardness ions.

The neutralizer, destainer, and passivating compositions include a ratio of the acids to the carrier, preferably water, on a weight percentage basis of from about 5:1 to about 1:1, from about 4.5:1 to about 1:1, from about 4:1 to about 1:1, from about 3.5:1 to about 1:1, from about 3:1 to about 1:1, from about 2.5:1 to about 1:1, from about 2:1 to about 1:1, from about 2.5:1 to about 0.5:1, from about 3:1 to about 0.3:1, or from about 3:1 to about 0.1:1.

In some embodiments, liquid compositions according to the present disclosure will contain no more than about 80 wt-% water, no more than 70 wt-% water, and typically no more than about 50 wt-% water. In other embodiments, liquid compositions will contain at least about 5 wt-% water, at least about 10 wt-% water, or at least about 25 wt-% water as a carrier. In an aspect, the compositions contain water in an amount of from about 5 wt-% to about 80 wt-%, from about 10 wt-% to about 70 wt-%, from about 20 wt-% to about 50 wt-%, or preferably from about 25 wt-% to about 45 wt-%. All ranges recited are inclusive of the numbers defining the range and include each integer within the defined range.

In a further embodiment, the compositions are provided as a solid. Solid compositions will contain less than about 30 wt-% water, less than about 15 wt-% water, less than about 10 wt-% water, or preferably less than about 5 wt-% water as a carrier. All ranges recited are inclusive of the numbers defining the range and include each integer within the defined range.

Additional Functional Ingredients

The components of the neutralizer, destainer, and passivating compositions can be combined with various functional components suitable for uses disclosed herein. In embodiments, the neutralizer, destainer, and passivating compositions comprising at least one acid, nonionic surfactant, and water make up a large amount, or even substantially all of the total weight of the compositions. For example, in some embodiments few or no additional functional ingredients are disposed therein.

In other embodiments, additional functional ingredients may be included in the compositions. The functional ingredients provide desired properties and functionalities to the compositions. For the purposes of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, a broad variety of other functional ingredients may be used. For example, many of the functional materials discussed below relate to materials used in cleaning. However, other embodiments may include functional ingredients for use in other applications.

In some embodiments, the neutralizer, destainer, and passivating compositions may include additional surfactants, defoaming agents, water conditioning agents, pH buffer, builders/sequestrants/chelating agents, anti-redeposition agents, bleaching agents, solubility modifiers, dispersants, metal protecting agents, soil antiredeposition agents, stabilizing agents, corrosion inhibitors, enzymes, aesthetic enhancing agents including fragrances and/or dyes, additional rheology and/or solubility modifiers or thickeners, hydrotropes or couplers, buffers, solvents, additional cleaning agents and the like. These additional ingredients can be pre-formulated with the compositions or added to the use solution before, after, or substantially simultaneously with the addition of the compositions.

According to embodiments, the various additional functional ingredients may be provided in a composition in the amount from about 0 wt-% and about 25 wt-%, from about 0 wt-% and about 20 wt-%, from about 0 wt-% and about 15 wt-%, or from about 0 wt-% and about 10 wt-%. All ranges recited are inclusive of the numbers defining the range and include each integer within the defined range.

Additional Surfactant

In an exemplary aspect, a nonionic surfactant available on the market under the trade name of "Pluronic" is included as an additional surfactant in the compositions. These compounds are formed by condensing ethylene oxide with a hydrophobic base formed by the condensation of propylene oxide with propylene glycol. The hydrophobic portion of the molecule has a molecular weight of from about 1,500 to 1,800. The addition of polyoxyethylene radicals to this hydrophobic portion tends to increase the water solubility of the molecule as a whole and the liquid character of the products is retained up to the point where the polyoxyethylene content is about 50 percent of the total weight of the condensation product.

The semi-polar type of nonionic surface active agents is another class of nonionic surfactant useful in compositions of the present disclosure. Semi-polar nonionic surfactants include the amine oxides, phosphine oxides, sulfoxides and their alkoxylated derivatives.

Amine oxides are tertiary amine oxides corresponding to the general formula:

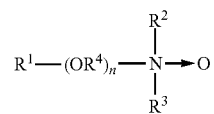

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate, or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g., 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present disclosure generally have the general formula:

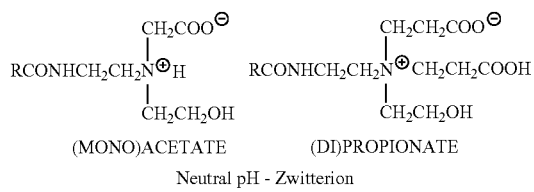

(MONO)ACETATE  (DI)PROPIONATE

Neutral pH - Zwitterion

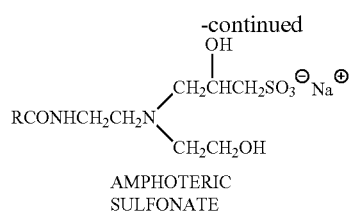

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this disclosure include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—CH$_2$—CH$_2$—N$^+$(CH$_2$—CH$_2$—CO$_2$Na)$_2$—CH$_2$—CH$_2$—OH or $C_{12}$-alkyl-C(O)—N(H)—CH$_2$—CH$_2$—N$^+$(CH$_2$—CO$_2$Na)$_2$—CH$_2$—CH$_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R\text{—}O\text{—}(CH_2CH_2O)_n(CH_2)_m\text{—}CO_2X \quad (3)$$

in which R is a $C_8$ to $C_{22}$ alkyl group or

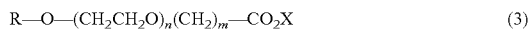

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

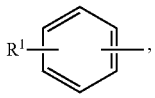

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12\text{-}13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g., the product SANDOPAN® DTC, a $C_{13}$ alkyl polyethoxy (7) carboxylic acid.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

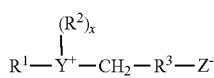

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-p-hosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

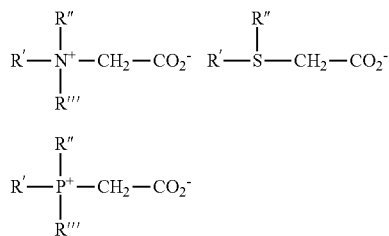

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present disclosure include those compounds having the formula $(R(R^1)_2N^+ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In some embodiments, the compositions primarily include nonionic surfactants as the surfactant. The compositions may be substantially free of amphoteric surfactants, anionic surfactants, and/or zwitterionic surfactants. In other embodiments, additional surfactants may be included as determined by a person having ordinary skill in the art.

Defoaming Agents

Defoaming agents can also be included in the compositions. Generally, defoamers which can be used in accordance with the disclosure preferably include alcohol alkoxylates and EO/PO block copolymers. Defoamers can also include polyalkylene glycol condensates and propyl glycols, including polypropyl glycol. In some embodiments, the compositions can include antifoaming agents or defoamers which are of food grade quality. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications.

Water Conditioning Agents

In some embodiments, the compositions can include a water conditioning agent. Carboxylates such as citrate, tartrate or gluconate are suitable. Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate (—$CO_2$—) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of water conditioning agents, see Kirk-Othmer, Encyclopedia of Chemical Technology, Third Edition, volume 5, pages 339-366 and volume 23, pages 319-320, the disclosure of which is incorporated herein by reference.

pH Buffer

In some embodiments, the compositions of the present disclosure can include a pH buffer, acidulant, and the like. The compositions can be formulated such that during use in aqueous operations, for example in aqueous cleaning operations, the rinse water will have a desired pH. For example, the compositions may be formulated such that during use in aqueous cleaning operations the rinse water will have a pH in the range of 8.5 or below, 8.3 or below, or 7 or below. In other aspects, the pH is about 3 to about 5, or in the range of about 5 to about 8.5. Liquid product formulations, such as use solutions of the compositions in some embodiments have a pH in the range of about 2 to about 4, in the range of about 4 to about 8, or about 7 or less. Techniques for controlling pH at recommended usage levels include the use of buffers, alkali, acids, etc., and are well known to those skilled in the art. Examples of suitable acids for controlling pH includes citric acid, hydrochloric acid, phosphoric acid, sodium bicarbonate, protonated forms of phosphonates, sodium benzoate and gluconic acid.

Chelating/Sequestering Agents

In some embodiments, the compositions can include one or more chelating/sequestering agents, which may also be referred to as a builder. A chelating/sequestering agent may include, for example an aminocarboxylic acid, aminocarboxylates and their derivatives, a polyacrylate, and mixtures and derivatives thereof. In general, a chelating agent is a molecule capable of coordinating (i.e., binding) the metal ions commonly found in natural water to prevent the metal ions from interfering with the action of the other ingredients of a wetting agent or other cleaning composition. The chelating/sequestering agent may also function as a threshold agent when included in an effective amount.

Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. The composition may include an aminocarboxylate or its derivatives, including for example sodium aminocarboxylate or a biodegradable aminocarboxylate or derivative thereof.

Methods of Use

The acid-based neutralizer, destainer, and passivating compositions employing the same can be used for a variety of applications. The compositions can be used in any applications where there is a surface in need for removal of scale and rust with a further need for passivation. For example, the compositions can be applied to a variety of surfaces, such as health care surfaces, food processing surfaces, agricultural or veterinary objects or surfaces, and hard surfaces, including those in health kitchens, bathrooms, factories, hospitals, offices, and preferably to processing of hard surface parts in need of instrument reprocessing. In an aspect, the compositions are applied to a metal surface in need of treatment. In a preferred embodiment, the metal surface is a health care instrument and/or health care instrument parts.

In an aspect, exemplary surfaces, including instruments suitable for reprocessing include any instrument, including medical or dental instruments or devices that can benefit from cleaning with a composition according to the present disclosure. Particularly suitable instruments include, but are not limited to: diagnostic instruments, scopes (e.g., endoscopes, StethoScopes, and arthroscopes) and related equipment, and the like, or combinations thereof.

Health care instrument parts can be made from a variety of materials, including various types of metal. In an aspect, the methods provide neutralizing, destaining, and passivating properties to any metal surface. In a further aspect, the health care instrument is stainless steel. The stainless steel may be any stainless steel grade. Preferably, the stainless steel is of a 300 series or 400 series stainless steel grade known to those of skill in the art and described in "Understanding Instrument Metal Terminology" Communiqué (May/June 2018), International Association of Healthcare Central Service Material Management (IAHCSMM), the disclosure of which is incorporated herein by reference in its entirety). Further included are Pakistan surgical stainless steel instruments.

The compositions can contact the surface or article in need of treatment by numerous methods for applying a composition, such as spraying the composition, immersing the object in the composition, or a combination thereof. A use concentration of the compositions can be applied to or brought into contact with a surface in need of treatment by any conventional method or apparatus for applying a cleaning composition to an object. For example, the object can be sprayed with, and/or immersed in the use solution made from the composition. The use solution of the composition can be sprayed onto a surface, the use solution of the composition can be caused to flow over the surface, or the surface can be dipped into the use solution of the composition. The contacting can be manual or by machine.

In an exemplary aspect, the methods can include use of an assembly-style application of the compositions. In an aspect, the use solution of the compositions can be sprayed while the parts are moving through a tunnel (or other site) spraying the formulations. This process can be manual, or partially or fully automated. In an exemplary embodiment, the process can take place on a stationary or moving surface.

In another aspect, the use solution of the composition can be dosed into a washer, tank, or other holding means, wherein the surface in need of treatment is submerged therein. In an aspect, the neutralizer, destainer, and passivating compositions are employed in a washer or a static soak. In an embodiment, the washer provides for the processing, cleaning and/or sanitizing of wares and/or instruments. In a preferred embodiment, the washer provides for reprocessing of a health care surface, including a health care instrument.

In an aspect, the application of the composition to a surface in need of treatment can be provided at any point of the cleaning process. The contacting of the surface with the use solution of the composition can be part of a multi-part process or a multi-phase system. Exemplary steps in the process or system employing the neutralizer, destainer, and passivating composition may include an initial prewash or hot wash step, a pretreatment step, a manual and/or automated washing step or main wash step with additional soaps, detergents and/or cleaners, ultrasonic wash, one or more rinse steps, a drying step, and/or a cleaning verification step.

In an embodiment, the neutralizer, destainer, and passivating composition is contacted to a surface in need of treatment at any point throughout the multi-part process or multi-phase system. In a further embodiment, the neutralizer, destainer, and passivating composition may be utilized as a stand-alone application to a surface in need of treatment.

In an aspect, the neutralizer, destainer, and passivating compositions can be employed at any temperature utilized in a wash process. For example, the temperature may be at any temperature suitable for use within a conventional initial prewash or hot wash step, a washing step or main wash step with additional soaps, detergents and/or cleaners, one or more rinse steps, and/or a drying step during a multi-part process or multi-phase system. In a preferred embodiment, a use solution of the composition contacts the surface being treated at a temperature of between about 25° C. and about 120° C., between about 30° C. and about 110° C., between about 35° C. and about 100° C., and preferably between about 35° C. and about 90° C. All ranges recited are inclusive of the numbers defining the range and include each integer within the defined range.

The contacting of the surface with the use solution of the composition can be for about 60 seconds to a few hours, from a few minutes to a few hours, from about 1 minute to about 60 minutes, or from about 10 minutes to about 60 minutes.

Beneficially, the methods described herein provide for the removal of hard water scale deposits as well as stains (such as rust) without the need to further scrub the surface being treated. In an aspect, the contacting of the composition to a surface in need of treatment removes scale deposits, rust, and/or stains from the surface. The composition further neutralizes high alkaline detergent residue that may be present on the surface. In addition to providing neutralizing and destaining/descaling effects, the compositions further provide a step of passivating a metal surface to maintain and/or restore the passive layer of the metal surface being treated. Maintaining and/or restoring the passive layer can reduce the reactivity of a metal surface making it less susceptible to corrosion. Beneficially, this reduction of corrosion prolongs the functional and usable life of the metal surface.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

The present disclosure is further defined by the following numbered paragraphs:

1. A neutralizer, destainer, and passivating composition comprising:
    from about 40 wt-% of at least one acid comprising citric acid;
    an alkoxylated nonionic surfactant; and
    water.

2. The composition of paragraph 1, wherein the at least one acid further comprises a weak acid having a pKa greater than about 2.5 and/or comprising lactic acid, oxalic acid, tartaric acid, malic acid, gluconic acid, or a combination thereof.
3. The composition of paragraph 2, wherein a ratio of the weak acid and the citric acid on a weight percent basis is (a) from about 1:20 to about 1:90, (b) from about 20:1 to about 90:1, or (c) from about 1:60 to about 60:1.
4. The composition of paragraph 3, wherein the weak acid is lactic acid.
5. The composition of any one of paragraphs 1-4, wherein the composition comprises from about 0.001-10 wt-% of the weak acid.
6. The composition of any one of paragraphs 1-5, wherein the nonionic surfactant is an alcohol alkoxylate surfactant.
7. The composition of paragraph 6, wherein the alcohol alkoxylate surfactant is according to the formula: $R^1$—O—$(EO)_x(PO)_y$—H, wherein $R^1$ is a straight-chain $C_{10}$-$C_{16}$ alkyl, wherein x is from 4 to 8, and wherein y is from 2 to 5.
8. The composition of paragraph 6, wherein the alcohol alkoxylate surfactant is according to the formula: 2-ethylhexyl$(PO)_m(EO)_n$, wherein m is from 3 to 14, and n is from 3 to 10.
9. The composition of any one of paragraphs 1-8, wherein the composition further comprises at least one additional functional ingredient.
10. The composition of any one of paragraphs 1-9, wherein the composition is a liquid concentrate that is diluted to form a use solution prior to use.
11. The composition of paragraph 10, wherein the at least one acid is present in the use solution in an amount of from about 700 ppm and 12,000 ppm, and the alkoxylated nonionic surfactant is present in the use solution in an amount of from about 25 ppm to about 500 ppm.
12. The composition of paragraph 10, wherein the use solution has a pH of about 7 or less.
13. The composition of any one of paragraphs 1-12, wherein the composition achieves a pass rating under a passivation test according to ASTM A380/A380M-17 and/or ASTM A967/A967M-17.
14. The composition of paragraph 13, wherein the composition does not cause any discoloration to a treated surface.
15. A method of neutralizing, destaining, and/or passivating a metal surface comprising: providing the composition according to any one of paragraphs 1-14; and contacting the composition to a metal surface in need of treatment.
16. The method of paragraph 15, wherein the metal surface is a health care instrument in need of instrument reprocessing.
17. The method of paragraph 15 or 16, wherein the step of contacting the composition occurs within a washer for health care instrument reprocessing.
18. The method of paragraph 15 or 16, wherein the step of contacting the composition occurs in a static soak of the metal surface for health care instrument reprocessing, wherein the static soak is from about 1 minute to about 60 minutes.
19. The method of any one of paragraphs 15-18, wherein the composition removes scale deposits, rust, and/or stains from the metal surface.
20. The method of any one of paragraphs 15-19, wherein the composition maintains and/or restores the passive layer of the metal surface.
21. The method of any one of paragraphs 15-20, wherein the composition is applied to the metal surface for a period of time from about 1 minute to about 30 minutes.
22. The method of paragraph 21, wherein the step of contacting the composition occurs at a temperature of between about 25° C. to about 120° C.
23. The method of any one of paragraphs 15-22, wherein the composition is diluted to form a use solution prior to the contacting.
24. The method of paragraph 23, wherein the use solution of the composition has a pH of about 7 or less.
25. The method of any one of paragraphs 15-24, wherein the composition achieves a pass rating under a passivation test according to ASTM A380/A380M-17 and/or ASTM A967/A967M-17.
26. The method of paragraph 25, wherein the composition does not cause any discoloration to the metal surface.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims. Exemplary components included in the formulations of the Examples include:

Surfactant: C10-C16 alcohol alkoxylate, nonionic surfactant.

Commercially available oxalic acid, lactic acid, and citric acid.

Example 1

Descaling and destaining effects of various neutralizer compositions were evaluated using the formulations provided in Table 2 in comparison to a commercially available descaling and neutralizing detergent containing <40 wt-% total of citric and oxalic acid ("Commercial A"). While the formulations provided in Table 2 are all embodiments of the disclosure, an exemplary embodiment is provided under Formulation A9-4. To evaluate descaling and destaining, Marble Testing and visual grading of rust coupons were completed. Both evaluations were conducted utilizing a BELIMED® washing machine.

For the Marble Testing, marble slabs were cut into cubes and rinsed with DI water, followed with an acetone rinse, and further followed by a final rinse with DI water. The marble cubes were pre-weighed and recorded prior to testing. Rust coupons were further prepared. One rust coupon and one marble cube was placed on each rack of the BELIMED® washing machine. Using 5 grain water, the wash cycle was set up to have an initial rinse cycle for a duration of 1 minute in mixed cold and hot water. The wash cycle was set up to wash for a duration of 15 minutes in 120° F. water, adjusting the concentration of the detergent being dosed. Lastly, a 1-minute rinse cycle was set up in mixed cold and hot water. The marble cubes and rust coupons were then collected after each cycle. This process was repeated until all formulations were evaluated. The marble cubes were weighed and recorded for purposes of calculating percent removal utilizing the following equation:

$$\text{Marble removal (\%)} = \frac{(\text{Pre marble weight} - \text{Post marble weight})}{(\text{Pre marble weight})} \times 100$$

The percentage of marble removal is reflective of descaling efficacy. The higher the percentage of marble removed, the greater the descaling efficacy of the tested formulation. Each of the formulations provided in Table 2 as well as the descaling and neutralizing detergent Commercial A product was provided in a use solution, where the total ppm concentration of each formulation after dilution is provided in FIG. 1. In particular, each of Formulations A9, A9-1, A9-2, A9-3 and A9-4 was tested at both a 5000 ppm and 9900 ppm concentration. The Commercial A product was tested at both an 8000 ppm and 16000 ppm concentration. The percentage of marble removed for each formulation is provided in FIG. 1.

Figure 2A:
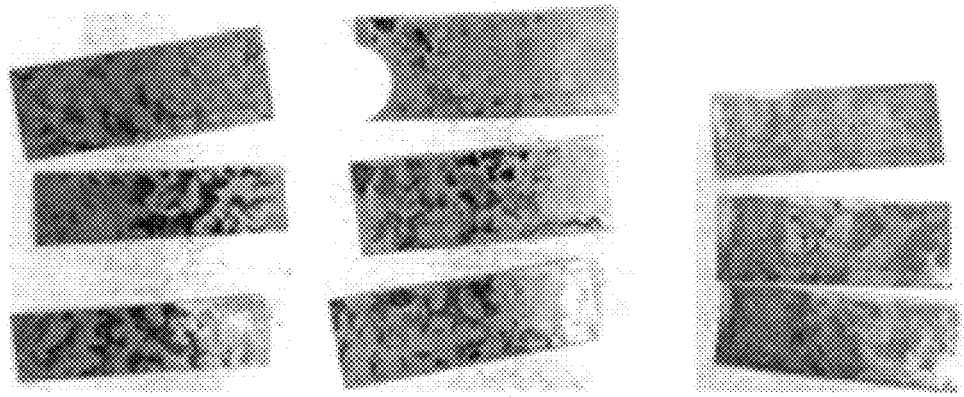
FIG. 2A shows an image of rust coupons showing the amount of rusting on samples ranging from a visual assessment scale (left to right) of (1) poor rust removal, (3) acceptable rust removal, to (5) good rust removal, for use as a guide in assessing the degree of rust removal for the tested coupons.
Figure 2B:
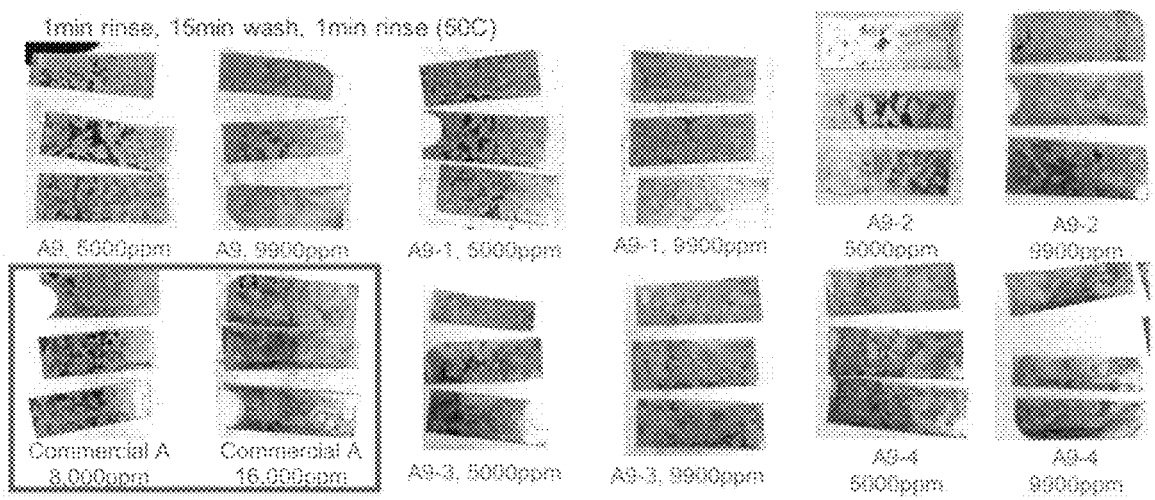
FIG. 2B shows an image of the rust coupons that were treated using the tested formulations after a 1-minute rinse period, 15-minute wash period, and an additional 1-minute rinse period at 50° C.

The rust coupons were visually graded utilizing the coupons shown in FIG. 2A as a guide in assessing the coupons. The coupons within FIG. 2A show the amount of rusting ranging from left to right of (1) poor rust removal, (3) acceptable rust removal, to (5) good rust removal. The results of the rust removal for the evaluated formulations is shown in FIG. 2B showing coupons in a top, middle and bottom rack (from top to bottom) where all coupons were assessed for rust removal after a 1-minute rinse period, a 15-minute wash period, and then additional 1-minute rinse period at 50° C.

TABLE 2

| | Formulation (wt-%) | | | | |
|---|---|---|---|---|---|
| Component | A9 | A9-1 | A9-2 | A9-3 | A9-4 |
| Water | 33.3 | 32.3 | 31.3 | 32.19 | 31.19 |
| Oxalic Acid | 0 | 1 | 1 | 0 | 0 |
| Lactic Acid, 90% | 0 | 0 | 0 | 1.11 | 1.11 |
| C10-C16 alcohol alkoxylate | 0 | 0 | 1 | 0 | 1 |
| Citric Acid, 50% | 66.7 | 66.7 | 66.7 | 66.7 | 66.7 |

As depicted in FIG. 1, the formulations all provided comparable or higher marble removal to the Commercial A product. These results demonstrate that the compositions of the present application are comparable in its effectiveness at descaling.

However, as the compositions are further intended to have destaining properties in addition to descaling, the visual grading of the rust coupons must also be considered. As depicted in FIG. 2B, the evaluated formulations all provided equal or better rust removal in comparison to the Commercial A product. The rating scale of the performance illustrated in FIG. 2B is shown in Table 3.

TABLE 3

| Formulation | ppm | Rating |
|---|---|---|
| A9 | 5000 | 3.5 |
| A9 | 9900 | 4.5 |

TABLE 3-continued

| Formulation | ppm | Rating |
|---|---|---|
| A9-1 | 5000 | 3.5 |
| A9-1 | 9900 | 5 |
| A9-2 | 5000 | 4 |
| A9-2 | 9900 | 5 |
| Commercial A | 8000 | 3 |
| Commercial A | 16,000 | 5 |
| A9-3 | 5000 | 4.5 |
| A9-3 | 9900 | 5 |
| A9-4 | 5000 | 5 |
| A9-4 | 9900 | 5 |

In particular, Formulation A9-4 provided superior removal of rust. The Commercial A product provided acceptable rust removal, whereas Formulation A9-4 at both the 5000 ppm and 9900 ppm concentration provided good rust removal according to the scale provided in FIG. 2A. When combining the results of both the Marble Testing and visual grading of the rust coupons, it can be seen that an exemplary embodiment containing a combination of citric acid, lactic acid, and a C10-C16 alcohol alkoxylate provided superior results in overall descaling and destaining effects.

Example 2

Additional evaluation of descaling and destaining effects of various neutralizer compositions were evaluated using the formulations provided in Table 4 to provide further comparison to the results in Example 1, including the commercially available descaling and neutralizing detergent containing citric and oxalic acid ("Commercial A") that was evaluated. The formulations provided in Table 4 are additional embodiments. The Marble Testing and visual grading of rust coupons were completed as described in Example 1.

TABLE 4

| | Formulation (wt-%) | | | |
|---|---|---|---|---|
| Component | A9-4 | A9-5 | A9-6 | A9-7 |
| Water | 31.19 | 59.9 | 51.9 | 43.1 |
| Lactic Acid, 90% | 1.11 | 37.1 | 27.1 | 15.9 |
| C10-C16 alcohol alkoxylate | 1 | 1 | 1 | 1 |
| Citric Acid, 50% | 66.7 | 2 | 20 | 40 |

The percentage of marble removal is reflective of descaling efficacy. The higher the percentage of marble removed, the greater the descaling efficacy of the tested formulation. Each of the formulations provided in Table 4 was provided in a use solution, where the total ppm concentration of each formulation after dilution is provided in FIG. 3. In particular, each of Formulations were tested at both a 5000 ppm and 10000 ppm concentration. The percentage of marble removed for each formulation is provided in FIG. 3.

Figure 4:
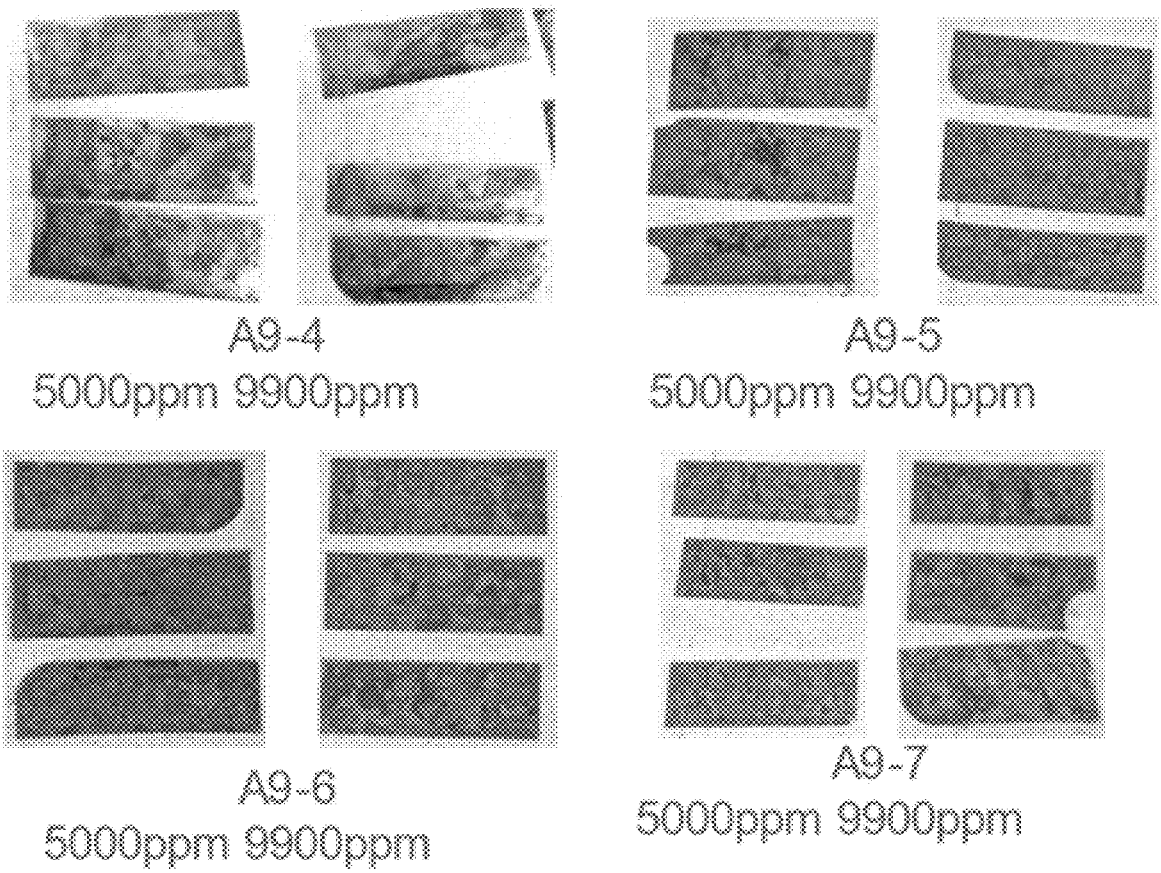
FIG. 4 shows an image of the rust coupons that were treated using additional tested formulations after a 1-minute rinse period, 15-minute wash period, and an additional 1-minute rinse period at 50° C.

The rust coupons were also visually graded utilizing the coupons shown in FIG. 4 as a guide in assessing the coupons. The same rating scale shown in FIG. 2A was used to assess the visual grading. The results of the rust removal can be found in FIG. 4 showing coupons in a top, middle and bottom rack (from top to bottom) where all coupons were assessed for rust removal after a 1-minute rinse period, a 15-minute wash period, and then additional 1-minute rinse period at 50° C.

Figure 3:
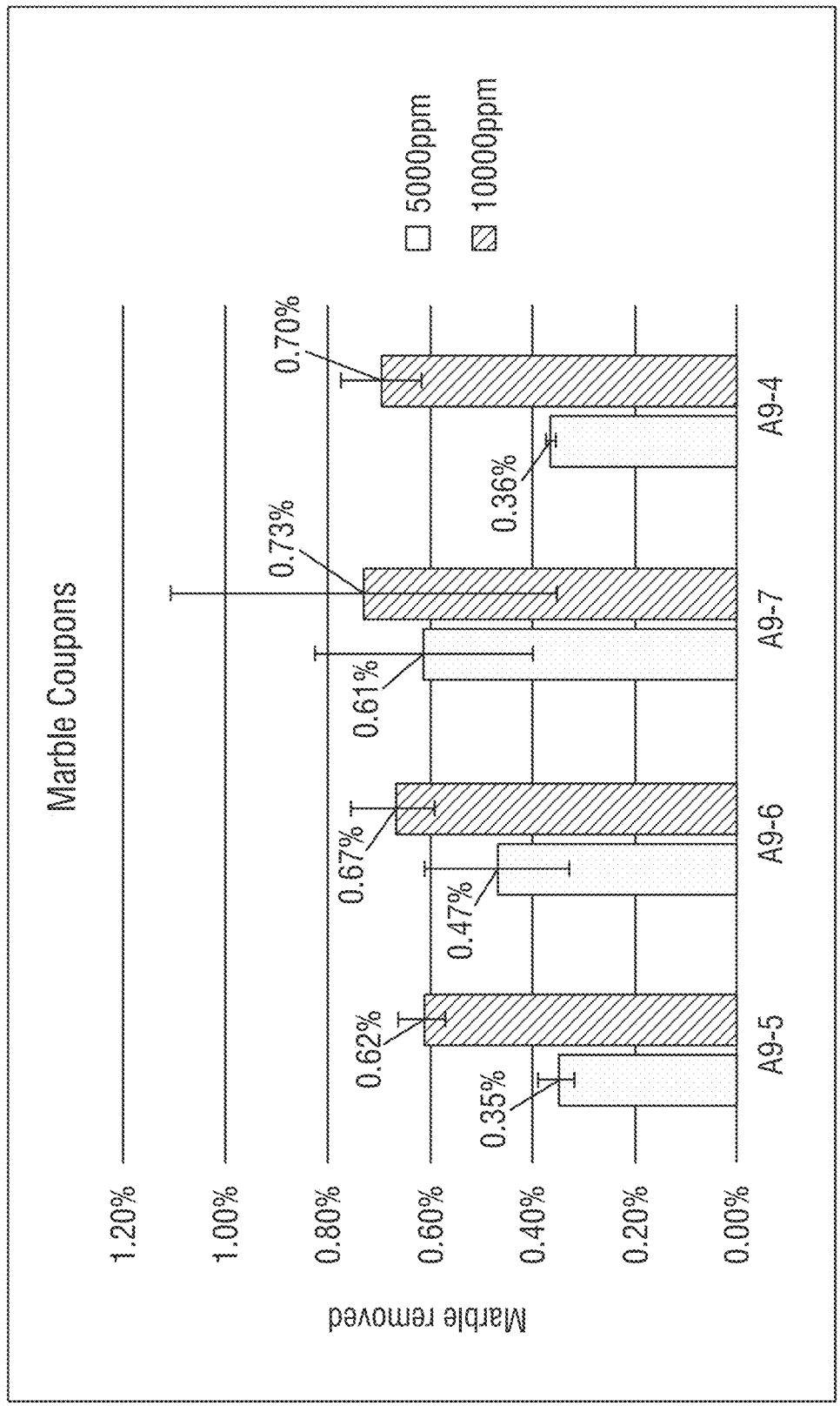
FIG. 3 shows a graph of the formulations that were evaluated for marble removal, with the higher percentage of marble removed demonstrating superior descaling efficacy.

As depicted in FIG. 3, the formulations provided comparable or higher marble removal to the Commercial A product as well as the other formulations evaluated. These results demonstrate that the compositions of the present application are comparable in its effectiveness at descaling. As the compositions are further intended to have destaining properties in addition to descaling, the visual grading of the rust coupons was also considered. As depicted in FIG. 4 the evaluated formulations provide better rust removal in order of preference in comparison to the Commercial A product as follows: A9-4>A9-7>A9-6>A9-5. In addition to Formulation A9-4 providing superior removal of rust the Formulation A9-7 also provided superior removal of rust.

When combining the results of both the Marble Testing and visual grading of the rust coupons, it can be seen that an exemplary embodiment containing a combination of citric acid, lactic acid, and a C10-C16 alcohol alkoxylate provided superior results in overall descaling and destaining effects, including when the ratio of the weak acid and the citric acid on a weight percent basis is inverted in comparison to the Formulations A9-4 (and others evaluated in Example 1).

Example 3

Passivation testing was further completed under standards provided by ASTM International. In particular, passivation testing was completed under section 7.2.5.4 of ASTM A380/A380M-17 and section 14.4 of ASTM A967/A967M-17. Formulation A9-4 and the commercially available descaling and neutralizing detergent ("Commercial A") from Example 1 were evaluated.

Stainless steel samples from various sources and treatments were provided to evaluate Formulation A9-4 and the Commercial A product. The tested samples are provided in Table 5. The 400 series stainless steel was evaluated according to section 7.2.5.4 of ASTM A380/A380M-17. The remainder of the samples and the 300 series stainless steel were evaluated according to section 14.4 of ASTM A967/A967M-17. Samples with metals described as "Pakistan" were determined to be consistent with 400 series stainless steel.

The appropriate formulation was applied to each metal sample and kept wet for six minutes. The samples were then carefully rinsed with distilled water. For samples made of 400 series stainless steel, each specimen was wiped using low lint, non-woven, cotton pads with moderate rigor to determine if any copper deposits were adherent. The remaining samples were rinsed gently with distilled water, gently dried with warm air and examined for any copper deposits. The passivation test is considered passing if no copper deposits are observed after treatment. The observations of the samples tested for passivation are presented in Table 6.

Each Sample ID was tested three times, therefore, if any of the tests demonstrated different results, the different results are also shown within the observations provided in the table.

TABLE 5

| Sample ID | Metal (stainless steel) | Formulation | Formulation Dose | |
|---|---|---|---|---|
| 400-1-3 | 400 | A9-4 | 4.0 mL/L | 4000 ppm |
| 400-4-6 | 400 | Commercial A | 0.5 oz/gal | 3118 ppm |
| 400-7-9 | 400 | A9-4 | 8.0 mL/L | 8000 ppm |
| 400-10-12 | 400 | Commercial A | 1 oz/gal | 6236 ppm |
| 400-13-15 | 400 | A9-4 | 20% | 200,000 ppm |
| 400-16-18 | 400 | Commercial A | 20% | 200,000 ppm |
| 300-1-3 | 300 | A9-4 | 4.0 mL/L | 4000 ppm |
| 300-4-6 | 300 | Commercial A | 0.5 oz/gal | 3118 ppm |
| 300-7-9 | 300 | A9-4 | 8.0 mL/L | 8000 ppm |
| 300-10-12 | 300 | Commercial A | 1 oz/gal | 6236 ppm |
| 300-13-15 | 300 | A9-4 | 20% | 200,000 ppm |
| 300-16-18 | 300 | Commercial A | 20% | 200,000 ppm |
| PA-1-3 | Pakistan | A9-4 | 4.0 mL/L | 4000 ppm |
| PA-4-6 | Pakistan | Commercial A | 0.5 oz/gal | 3118 ppm |
| PA-7-9 | Pakistan | A9-4 | 8.0 mL/L | 8000 ppm |
| PA-10-12 | Pakistan | Commercial A | 1 oz/gal | 6236 ppm |
| PA-13-15 | Pakistan | A9-4 | 20% | 200,000 ppm |
| PA-16-18 | Pakistan | Commercial A | 20% | 200,000 ppm |
| 316-1-3 | 316 | A9-4 | 4.0 mL/L | 4000 ppm |
| 316-4-6 | 316 | Commercial A | 0.5 oz/gal | 3118 ppm |
| 316-7-9 | 316 | A9-4 | 8.0 mL/L | 8000 ppm |
| 316-10-12 | 316 | Commercial A | 1 oz/gal | 6236 ppm |
| 316-13-15 | 316 | A9-4 | 20% | 200,000 ppm |
| 316-16-18 | 316 | Commercial A | 20% | 200,000 ppm |
| 316-19-21 | 316 | A9-4 | 30% | 300,000 ppm |
| 316-22-24 | 316 | Commercial A | 30% | 300,000 ppm |
| 316-25-27 | 316 | A9-4 | 15% | 150,000 ppm |
| 316-28-30 | 316 | Commercial A | 15% | 150,000 ppm |
| 316-31-33 | 316 | A9-4 | 10% | 100,000 ppm |
| 316-34-36 | 316 | Commercial A | 10% | 100,000 ppm |
| 420-1-3 | 420 | A9-4 | 4.0 mL/L | 4000 ppm |
| 420-4-6 | 420 | Commercial A | 0.5 oz/gal | 3118 ppm |
| 420-7-9 | 420 | A9-4 | 8.0 mL/L | 8000 ppm |
| 420-10-12 | 420 | Commercial A | 1 oz/gal | 6236 ppm |
| 420-13-15 | 420 | A9-4 | 20% | 200,000 ppm |
| 420-16-18 | 420 | Commercial A | 20% | 200,000 ppm |
| 420-19-21 | 420 | A9-4 | 30% | 300,000 ppm |
| 420-22-24 | 420 | Commercial A | 30% | 300,000 ppm |
| 420-25-27 | 420 | A9-4 | 15% | 150,000 ppm |
| 420-28-30 | 420 | Commercial A | 15% | 150,000 ppm |
| 420-31-33 | 420 | A9-4 | 10% | 100,000 ppm |
| 420-34-36 | 420 | Commercial A | 10% | 100,000 ppm |

TABLE 6

| Sample ID | Passivation Test Observations |
|---|---|
| 400-1-3 | No copper adhered by unaided eye nor by stereo microscope up to 20X |
| 400-4-6 | No copper adhered by unaided eye nor by stereo microscope up to 20X |
| 400-7-9 | No copper adhered by unaided eye nor by stereo microscope up to 20X; One test had copper formed on the blade of the metal sample and some adhered |
| 400-10-12 | No copper adhered by unaided eye nor by stereo microscope up to 20X |
| 400-13-15 | No copper adhered by unaided eye nor by stereo microscope up to 20X |
| 400-16-18 | No copper adhered by unaided eye nor by stereo microscope up to 20X; One test had adhered copper observed |
| 300-1-3 | No copper adhered by unaided eye nor by stereo microscope up to 20X |
| 300-4-6 | No copper adhered by unaided eye nor by stereo microscope up to 20X |
| 300-7-9 | No copper adhered by unaided eye nor by stereo microscope up to 20X |
| 300-10-12 | No copper adhered by unaided eye nor by stereo microscope up to 20X |
| 300-13-15 | No copper adhered by unaided eye nor by stereo microscope up to 20X |
| 300-16-18 | No copper adhered by unaided eye nor by stereo microscope up to 20X |

TABLE 6-continued

| Sample ID | Passivation Test Observations |
|---|---|
| PA-1-3 | No copper adhered by unaided eye nor by stereo microscope up to 20X |
| PA-4-6 | No copper adhered by unaided eye nor by stereo microscope up to 20X |
| PA-7-9 | No copper adhered by unaided eye nor by stereo microscope up to 20X |
| PA-10-12 | No copper adhered by unaided eye nor by stereo microscope up to 20X |
| PA-13-15 | No copper adhered by unaided eye nor by stereo microscope up to 20X |
| PA-16-18 | Adhered copper is present |
| 316-1-3 | No copper adhered by unaided eye nor by stereo microscope up to 20X |
| 316-4-6 | No copper adhered by unaided eye nor by stereo microscope up to 20X |
| 316-7-9 | No copper adhered by unaided eye nor by stereo microscope up to 20X |
| 316-10-12 | No copper adhered by unaided eye nor by stereo microscope up to 20X |
| 316-13-15 | No copper adhered by unaided eye nor by stereo microscope up to 20X |
| 316-16-18 | No copper adhered by unaided eye nor by stereo microscope up to 20X |
| 316-19-21 | No copper adhered by unaided eye nor by stereo microscope up to 20X |
| 316-22-24 | No copper adhered by unaided eye nor by stereo microscope up to 20X |
| 316-25-27 | No copper adhered by unaided eye nor by stereo microscope up to 20X |
| 316-28-30 | No copper adhered by unaided eye nor by stereo microscope up to 20X |
| 316-31-33 | No copper adhered by unaided eye nor by stereo microscope up to 20X |
| 316-34-36 | No copper adhered by unaided eye nor by stereo microscope up to 20X |
| 420-1-3 | No copper adhered by unaided eye nor by stereo microscope up to 20X |
| 420-4-6 | No copper adhered by unaided eye nor by stereo microscope up to 20X; Two tests had trace copper adhered |
| 420-7-9 | No copper adhered by unaided eye nor by stereo microscope up to 20X |
| 420-10-12 | No copper adhered by unaided eye nor by stereo microscope up to 20X |
| 420-13-15 | No copper adhered by unaided eye nor by stereo microscope up to 20X |
| 420-16-18 | No copper adhered by unaided eye nor by stereo microscope up to 20X |
| 420-19-21 | No copper adhered by unaided eye nor by stereo microscope up to 20X |
| 420-22-24 | Some copper adhered on stained area |
| 420-25-27 | No copper adhered by unaided eye nor by stereo microscope up to 20X |
| 420-28-30 | Slight copper on top of apparent chromium oxide discoloration |
| 420-31-33 | No copper adhered by unaided eye nor by stereo microscope up to 20X |
| 420-34-36 | No copper adhered by unaided eye nor by stereo microscope up to 20X |

As demonstrated within the results of the passivation testing in Table 5, the sample ID's that failed the passivation testing include one test within 400-7-9, one test within 400-16-18, all tests within PA-16-18, two tests within 420-4-6, all tests within 420-22-24, and all tests within 420-28-30. With the exception of the one test within 400-7-9 that resulted in some copper that adhered, the remainder of the samples that failed the passivation test were all with the Commercial A product. As such, these results demonstrate that exemplary embodiment A9-4 provides superior passivation over a commercially available descaler and neutralizing detergent.

Furthermore, Samples (1) 400-16-18; (2) PA-16-18; (3) 420-16-18; (4) 420-22-24; and (5) 420-28-30, which are all Commercial A products, resulted in a green staining of the metal samples. Without being limited to a particular theory or mechanism, it is believed that the green staining is due to a chromium oxide layer that has formed. The passivation testing therefore demonstrates that not only does the A9-4 formulation provide superior passivation, it also does not cause discoloration of the metal surface.

The disclosures being thus described, it will be obvious that the same may be varied in many ways. Such variations are not to be regarded as a departure from the spirit and scope of the disclosures and all such modifications are intended to be included within the scope of the following claims. The above specification provides a description of the manufacture and use of the disclosed compositions and methods. Since many embodiments can be made without departing from the spirit and scope of the disclosure, the invention resides in the claims.

What is claimed is:

1. A neutralizer, destainer, and passivating composition comprising:

from about 40 wt-% to 75 wt-% of citric acid and an additional weak acid having a pKa greater than about 2.5, wherein the additional weak acid comprises from about 0.001 wt-% to 10 wt-%;

an alcohol alkoxylated nonionic surfactant according to the formula: $R^1$—O—$(EO)_x(PO)_y$-H wherein R is a straight-chain $C_{10}$-$C_{16}$ alkyl, and wherein x is from 4 to 8, and wherein y is from 2 to 5; and water.

2. The composition of claim 1, wherein the additional weak acid comprises lactic acid, oxalic acid, tartaric acid, malic acid, gluconic acid, or a combination thereof.

3. The composition of claim 1, wherein a ratio of the additional weak acid and the citric acid on a weight percent basis is (a) from about 1:20 to about 1:90, (b) from about 20:1 to about 90:1, or (c) from about 1:60 to about 60:1.

4. The composition of claim 3, wherein the additional weak acid is lactic acid.

5. The composition of claim 1, further comprising an additional alcohol alkoxylated nonionic surfactant, wherein the additional alcohol alkoxylate is branched and has both ethylene oxide and propylene oxide groups.

6. The composition of claim 5, wherein the branched alcohol alkoxylated nonionic surfactant is according to the formula: 2-ethylhexyl (PO) m (EO) n, wherein m is from 3 to 5, and n is from 5 to 8.

7. The composition of claim 1, wherein the composition is a liquid concentrate that is diluted to form a use solution prior to use.

8. The composition of claim 7, wherein the additional weak acid and citric acid is present in the use solution in an amount of from about 700 ppm to about 12,000 ppm, and the alcohol alkoxylated nonionic surfactant is present in the use solution in an amount of from about 25 ppm to about 500 ppm, and wherein the use solution has a pH of about 7 or less.

9. The composition of claim 1, wherein the composition achieves a pass rating under a passivation test according to ASTM A380/A380M-17 and/or ASTM A967/A967M-17 and/or does not cause any discoloration to a treated surface.

* * * * *